No. 768,516. Patented August 23, 1904.

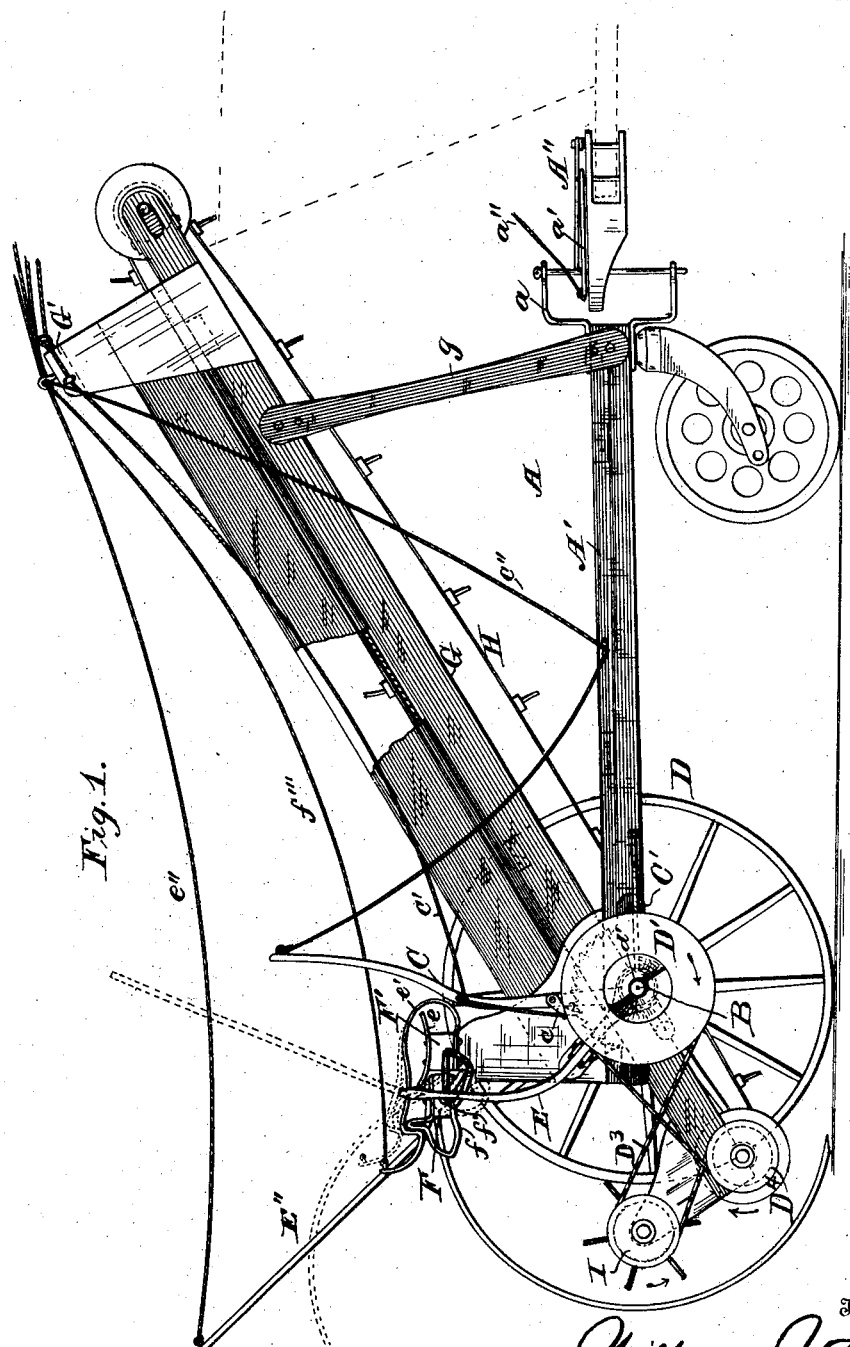

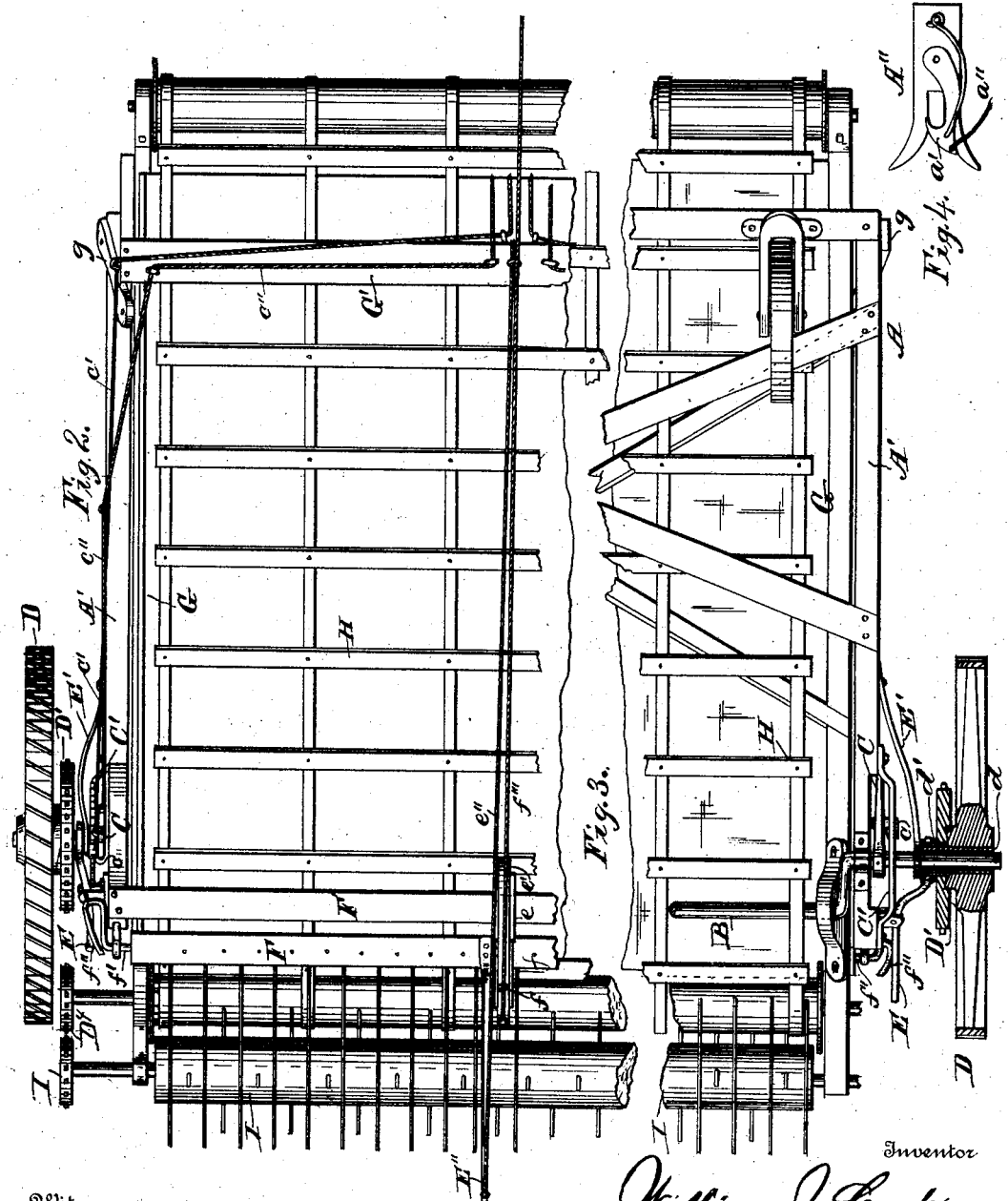

UNITED STATES PATENT OFFICE.

WILLIAM J. COOK, OF SUN RIVER, MONTANA.

HAY RAKER AND LOADER.

SPECIFICATION forming part of Letters Patent No. 768,516, dated August 23, 1904.

Application filed April 23, 1904. Serial No. 204,570. (No model.)

*To all whom it may concern:*

Be it known that I, WILLIAM J. COOK, a citizen of the United States, residing at Sun River, in the county of Cascade and State of Montana, have invented a new and useful Machine for Gathering and Loading Hay, of which the following is a specification.

This invention relates to certain new and useful improvements in hay rakers and loaders, the purpose of the invention being to provide means whereby when the rake is raised the supporting and driving wheels of the machine will be placed out of engagement with the mechanism which actuates a traveling apron or inclined carrier.

A further purpose of this invention is to provide means whereby the position of the frame of the traveling apron may be varied to suit the condition of the crop or the height of the vehicle into which the hay is delivered.

The invention is also designed to provide means whereby the driver of the animals attached to the wagon in which the hay is delivered may operate the parts of the gatherer and loader from his seat.

In the accompanying drawings, which form a part of this specification, Figure 1 is a side elevation of a combined raker and loader constructed in accord with my invention, and in this view one of the supporting-wheels has been removed from the axle. Fig. 2 is a plan view of a portion of the machine. Fig. 3 is an inverted plan view of a part of the machine, the main driving sprocket-wheel and the supporting-wheel being in section; and Fig. 4 is a detail view of the coupling used to connect the raker and loader to a wagon.

The machine is designed to be attached to a wagon and is drawn along with it and rakes and loads from the field directly into the wagon.

The base-frame A is made up of longitudinal bars A', the front cross-bar, and intermediate braces. Caster-wheels are attached to the front cross-bar, which is also provided centrally with a clevis $a$, having a vertical pin, with which a coupling A'', attached to the reach of a wagon, engages. The rear portion of the frame A has bearings for a crank-axle B, upon the outer ends of which are placed the main supporting and driving wheels D D, said wheels having boxes $d$ and clutch-faces to engage similar clutch-faces of sprocket or gear wheels D'. The gear or sprocket wheels have boxes $d'$, which overlie the boxes $d$ of the wheels D, and the inner ends of the boxes $d'$ have flanges or grooves, with which engage the bifurcated ends of levers E.

The sprocket-wheels D' and the supporting-wheels D are normally held in engagement by springs E', attached to longitudinal side bars of the frame A, so that the free ends will bear against the ends of the boxes $d'$. The levers E are so mounted by being pivoted to brackets which project upward from the rear ends of the longitudinal beams A' that when the upper ends of the levers are moved outward the clutch-faces will be separated and the gearing or parts driven from the gear-wheel D' will remain idle.

C refers to a lever, one end of which is rigidly secured to the projecting ends of the crank-axle B, adjacent to the longitudinal beams A', said beams carrying a ratchet-plate C', with which a pawl $c$ may engage by gravity, and from the pawl there extends a flexible connection $c'$, which is guided through suitable eyes attached to the lever and to the frame which supports the endless apron. The tendency of the lever C is to swing rearward when its pawl is out of engagement with the teeth of the segmental ratchet-plate, and said lever is moved forward to elevate the frame having the endless apron by means of a flexible connection $c''$, which extends from the upper end of the lever through an eye attached to the longitudinal beam of the frame A and from thence upward and forward, so as to be operated by the driver seated on the wagon into which the hay is delivered.

The upper ends of the brackets at the rear portion of the frame A are connected by a cross-bar F', which serves as a brace for the rear portion of the frame A and as supports for a stop-plate $e$ and a spring-catch $e'$, said catch being adapted to engage a fixture $f$, carried by the rake-bar F. The rake-bar F is journaled in rear of the brace-bar F', being connected to the brackets by eyebolts which project upward and rearward therefrom, and through the eyes of the bolts pass the journals $f'$ of the rake-bar, such journals either carrying cams or being bent to such shape as to provide inclined surfaces $f''$, which engage with the levers E, so as to throw the upper ends of said levers outward and by such movement disengage the clutch-faces of the driving-gear and supporting-wheels when the rake-bar is rocked to elevate the teeth, so that when the rake is out of operative position the traveling apron will remain idle.

E″ refers to a lever which is centrally attached to the rake-bar, and this lever is provided with a flexible connection $e''$, which extends forward, as shown.

The spring-catch is provided with a flexible connection $f''''$ for lifting said catch out of engagement with the fixture, more particularly when it is desired to lower the rake-teeth from an elevated position, and when the rake-teeth are raised the fixture will engage the forwardly-projecting ends of the stop-plate $e$ to limit the forward or upward movement of the rake-teeth.

The apron-carrying frame G is of ordinary construction and has bearings for the axle B, which connects the rear portion to the supporting-frame A. The front portion of such frame is held at the desired elevation by braces $g$, which are adjustably connected to the two frames. The apron or endless carrier H passes over rollers, and the frame has a floor and upwardly-projecting side pieces as well as brackets, the forward and upper brackets being connected by a cross-bar G′, while the lower brackets have bearings for a toothed roller I. When the supporting-wheels D are in gear with the driving-wheels D′, they will turn in unison, and chains or belts $D^3$, which extend from the wheels D′ to the roller-shaft or sprockets $D^4$ thereon to drive the traveling apron H and the belt or sprocket-chain $D^5$, also drives the toothed roller I, which engages the hay as it is gathered by the rake and assists in placing it upon the endless apron or carrier-belt H, by which it is elevated and deposited into a wagon.

The wagon into which the hay is delivered is connected to the raker and loader by a coupling A″, the spring-actuated latch $a'$ thereof being provided with a flexible connection $a''$, whereby the latch can be moved against the action of its spring by the driver of the wagon.

By the construction and arrangement shown I provide means whereby the levers for raising the rake-teeth and for adjusting the height of the frame having the traveling apron may be operated by the driver of the wagon, who also may detach the raker and loader from the wagon, and I also provide means for automatically placing the driving-gear so that it will remain idle when the rake is elevated.

Having thus set forth my invention, what I claim as new, and desire to secure by Letters Patent, is—

1. In a hay rake and loader, the combination of a wheel-supported frame having rake-teeth connected thereto, an inclined frame provided with an endless carrier, a crank-axle journaled to both of the frames, and means for turning the axle to vary the position of the inclined frame with respect to the frame having the rake-teeth.

2. In a hay rake and loader, the combination of a wheel-supported frame, an inclined frame in movable engagement therewith, a crank-axle journaled to each of the frames, a lever attached to the crank-axle to move the same and vary the position of the inclined frame, a drive-roller for the endless carrier, a toothed roller maintained at a higher elevation than the drive-roller of the carrier, and gearing for actuating the rollers.

3. In a hay rake and loader, a wheeled supporting-frame, a frame connected thereto by a crank-axle and provided with an endless carrier, a lever fast to the crank-axle and a flexible connection attached to the lever and extending therefrom to a point beyond the frames.

4. In a hay rake and loader, a wheel-supported frame, a rake-bar in pivotal engagement therewith, a cam connected to the bar, a lever mounted to be engaged by the cam, a clutch-section which is engaged by the lever to move the same out of engagement with a clutch-section on the drive-wheel, substantially as shown.

5. The combination in a hay rake and loader, of a wheel-supported rake-carrying frame, an inclined frame having an endless carrier and a toothed roller positioned to be above the lower end of the carrier and adjacent to the rake-teeth, a crank-axle connecting the frames, a lever for turning the axle to raise the carrier-frame and gearing for the endless carrier and the toothed roller including clutch-sections which are separated to place the gearing out of action when the rake-teeth are raised, substantially as set forth.

In testimony whereof I have signed my name to this specification in the presence of two subscribing witnesses.

WILLIAM J. COOK.

Witnesses:
B. A. ROBERTSON,
J. C. MORGAN.